(12) United States Patent
Armoa

(10) Patent No.: US 11,997,942 B2
(45) Date of Patent: Jun. 4, 2024

(54) DETACHABLE DEPTH-GAUGE LEVELING WHEEL WITH STUBBLE SWEEPER

(71) Applicant: Luciano Damián Armoa, Carcarañá (AR)

(72) Inventor: Luciano Damián Armoa, Carcarañá (AR)

( * ) Notice: Subject to any disclaimer, the term of this patent is extended or adjusted under 35 U.S.C. 154(b) by 0 days.

(21) Appl. No.: 18/269,267

(22) PCT Filed: Dec. 22, 2021

(86) PCT No.: PCT/EP2021/087277
§ 371 (c)(1),
(2) Date: Jun. 22, 2023

(87) PCT Pub. No.: WO2022/136542
PCT Pub. Date: Jun. 30, 2022

(65) Prior Publication Data
US 2023/0389463 A1 Dec. 7, 2023

(30) Foreign Application Priority Data
Dec. 22, 2020 (AR) .............................. P20200103621

(51) Int. Cl.
*A01C 7/20* (2006.01)
*A01C 5/06* (2006.01)
(Continued)

(52) U.S. Cl.
CPC .............. *A01C 7/203* (2013.01); *A01C 5/064* (2013.01); *A01C 5/068* (2013.01); *A01C 7/006* (2013.01); *B60B 3/10* (2013.01)

(58) Field of Classification Search
CPC ......... A01C 7/006; A01C 7/203; A01C 5/064; A01C 5/068; B60B 3/004; B60B 3/005;
(Continued)

(56) References Cited

U.S. PATENT DOCUMENTS

| | | | | |
|---|---|---|---|---|
| 5,727,850 A | * | 3/1998 | Masclet | ................... A61G 5/10 301/122 |
| 5,970,891 A | | 10/1999 | Schlagel | |

(Continued)

FOREIGN PATENT DOCUMENTS

| | | |
|---|---|---|
| AR | 033149 A1 | 12/2003 |
| CN | 201409283 Y * | 2/2010 |

(Continued)

OTHER PUBLICATIONS

International Search Report for related patent application PCT/EP2021/087277 prepared by the European Patent Office and dated Mar. 31, 2022, 5 pgs., in English.

(Continued)

*Primary Examiner* — Alicia Torres
(74) *Attorney, Agent, or Firm* — Hassan Abbas Shakir; Shakir Law PLLC

(57) ABSTRACT

A groove depth-leveling wheel used in planting groups defines the depth of the furrow opened by the planting disc for uniform planting. The wheel has blades on its outer side to prevent reeds, stubble, straws etc. from sticking between this wheel and the planting disc and blocking the wheel or the planting disc itself.

7 Claims, 15 Drawing Sheets

(51) Int. Cl.
*A01C 7/00* (2006.01)
*B60B 3/10* (2006.01)

(58) Field of Classification Search
CPC .. B60B 3/007; B60B 3/02; B60B 3/10; B60B 3/14; B60B 3/142; B60B 3/145; B60B 25/08; B60B 25/20; B60B 7/26; B60B 7/0013; B60B 7/065; B60B 7/14
See application file for complete search history.

(56) References Cited

U.S. PATENT DOCUMENTS

| | | | | |
|---|---|---|---|---|
| 7,584,706 | B1* | 9/2009 | Smith | A01C 5/068 111/167 |
| 7,743,718 | B2* | 6/2010 | Bassett | A01C 7/006 111/140 |
| 8,104,543 | B2* | 1/2012 | Hesla | A01C 5/064 111/167 |
| 8,359,988 | B2* | 1/2013 | Bassett | A01B 63/045 111/140 |
| 9,204,591 | B2 | 12/2015 | Hesla | |
| 10,251,335 | B2 | 4/2019 | Phely | |
| 2004/0089209 | A1 | 5/2004 | Joaquin Romagnoli | |
| 2012/0104835 | A1* | 5/2012 | Waldner | B60B 3/10 301/64.101 |
| 2015/0230392 | A1 | 8/2015 | Schafer et al. | |
| 2018/0103570 | A1 | 4/2018 | Sorensen | |

FOREIGN PATENT DOCUMENTS

| | | | |
|---|---|---|---|
| CN | 206171022 U | * | 5/2017 |
| CN | 107962908 A | * | 4/2018 |
| EP | 3034322 A1 | | 6/2016 |
| EP | 3034322 B1 | | 5/2019 |
| WO | 2015127054 A1 | | 8/2015 |
| WO | 2018075496 A1 | | 4/2018 |

OTHER PUBLICATIONS

Written Opinion of International Searching Authority, Search Report for related patent application PCT/EP2021/087277 prepared by the European Patent Office and dated Mar. 31, 2022, 7 pgs., in English.

* cited by examiner

DETACHABLE DEPTH-GAUGE LEVELING WHEEL WITH STUBBLE SWEEPER

CROSS-REFERENCE TO RELATED APPLICATIONS

This application is a national stage under 35 U.S.C. § 371 of PCT patent application PCT/EP2021/087277 filed on 22 Dec. 2021, which is pending and which is hereby incorporated by reference in its entirety for all purposes. PCT/EP2021/087277 claims priority to Argentinian Patent Application P20200103621 filed 22 Dec. 2020, which is hereby incorporated by reference in its entirety for all purposes.

FIELD OF THE INVENTION

The invention is directed to an agricultural machine. More particularly, the invention is directed to a planting agricultural machine equipped with a set of planting units linked to a tool bar dragged by a tractor, designed to open a furrow in the ground, deposit the seed and, eventually, the fertilizer at a certain depth that is mainly determined by the leveling wheel, and then cover the furrow again to ensure normal plant growth.

State-of-the Art Technique and Problems to be Solved

The present invention refers to the problems related to the leveling wheel in each planting unit. Said problems are both cumbersome and time-consuming in terms not only of maintenance tasks but also of operation during the planting process itself. Efficient planting requires all seeds to be deposited at a constant depth; however, this that does not always occur for various reasons. For instance, there is a recurrent problem related to the direct planting technique, often performed without prior tillage or plowing for the preparation of the seedbed. This often involves encountering a very uneven terrain as the unremoved stubble of the previous harvest (straw, reeds, etc.) often sticks between the leveling wheel and the planting disc. Therefore, the wheel stops rotating. This changes the furrow depth and, in turn, the depth at which the seeds are deposited.

Normally, the leveling wheel, mounted very close to the planting disc, has a tread that whenever it rolls on the ground, alongside the furrow to be dug, it transmits to the planting disc a reference of the ground level in order to adjust the furrow depth. As its depth may vary depending on the type of seed used, it is very important to ensure that the leveling wheel continues to operate normally, without causing any blockage whatsoever. However, a major problem may arise if the terrain conditions are far from optimal; for example, due to excess moisture the mud is likely to accumulate between both elements and if it sticks to them, it may end up blocking any of them, and thus, affecting the efficiency of the seeding operation.

Additionally, another recurrent problem may arise in planting units. It pertains to the maintenance of the leveling wheel and its close contact with the ground. Thus, as it gets dirty, it requires regular cleaning and greasing to ensure proper planting operation. This is a time-consuming maintenance task as modern seeders can have more than sixty row-seeders and two leveling wheels per row.

In turn, another significant loss of time related to the maintenance of the planting unit is the replacement of the tire due to, either its normal wear or the use of a wider tire to avoid soil compaction as well as the replacement of the bearings of the leveling wheel. Nowadays, any attempt to carry out this operation, both the mounting arm and leveling wheel assembly require prior removal from the seeding unit of the seeder. Then, it is essential to remove the adjusting nut linking the leveling wheel-mounting arm with the leveling wheel assembly. This assembly is made up of the cast mass or similar material where the bearings, the rim and the tire are housed. It is required to hit the inner track of the bearings with a bushing in order to detach them from the internal housing of the mass or, otherwise, to use a press to avoid hitting any component. Besides, placing the new bearings requires nailing them in the internal housing of the mass by hitting or exerting pressure with an auxiliary tool. Then, it is required to place the adjustment and protection elements against dust or external agents and, afterwards, to reassemble the leveling wheel on the mounting arm and, finally, this assembly to the shaft of the planting unit of the seeder.

Additionally, to prevent the tire from coming off the rim when the machine is in operation, the inner diameter of the tire is smaller than the outer diameter of the rim and, therefore, in order to assemble the tire/rim assembly it is necessary to exert pressure to stretch the tire in order to mount it on the rim. This job requires a hydraulic press in the workshop or auxiliary tools that often turn the task quite cumbersome if performed in the middle of the field.

The current state of the art has offered some solutions to said problems. For instance, some manufacturers prefer to leave a significant space of at least four centimetres, between the planting disc and the leveling wheel to avoid compacting the soil beside the planting furrow; thus, making it easier for the capping wheel to fulfill its objective. However, under certain soil conditions any attempt to leave a space may allow the mud to stick to the planting disc itself while allowing debris to remain in the furrow and thus constraining its coverage and, eventually, putting at risk the efficiency of the germination process.

Some solutions have proposed a large number of leveling wheel designs, including the use of two wheels instead of just one, or the combination of a leveling wheel with a capping wheel, as is the case of the patent "AR033149B1".

Most of the solutions proposed to prevent the soil from sticking to the leveling wheel or to the furrow disc include the use of a scraper or cleaning element whose function is to remove the mud stuck to them.

For example, the publication "WO2018075496A1" proposes a scraper for the leveling wheel and has one main advantage as it consists of a few pieces and does not require permanent adjustments. Besides, it does not damage the leveling wheel itself. In any case, this solution does not prevent the accumulation of mud between the planting disc and the leveling wheel itself, nor does it prevent previous harvest stubble from getting into the furrow or altering the open furrow depth and, in turn, its planting efficiency.

Another more comprehensive solution is the one proposed in the patents "U.S. Pat. No. 9,204,591B2", and in the "U.S. Pat. No. 8,104,543B2", both belonging to the same holder. In addition to using a scraper to prevent mud from sticking to both the planting disc and the leveling wheels, it has a pair of opposite openings in each of the leveling wheels. This feature allows the mud to be released avoiding blockage of either the planting disc or any of the leveling wheels.

In addition to the above mentioned solutions, a similar one concerning mud release between the planting disc and the leveling wheel is proposed in "US2012104835A1", since the leveling wheel has a structure with spokes that define exit spaces for the accumulated mud between the two components, thus preventing any of them from being blocked.

However, although the last two documents present solutions for mud release using leveling wheels with spokes or openings, their use generates the additional problem that stones, plant debris, straw, reeds and others may get through said openings and block the rotation of the leveling wheel. Besides, the planting disc may lock itself up, preventing the planting from being carried out normally.

In turn, the publication "WO2015127054" poses a solution to the problem of the leveling wheel maintenance since, due to its close contact with the ground becomes dirty and must be permanently greased. However, said proposed solution does not tackle the tire periodical replacement, which is definitely quite time consuming.

In spite of the existing solutions, it is still necessary to avoid the entry of the remaining stubble in the field into the space between the planting disc and the leveling wheel as they may block the rotation of any of these elements. There is also a need to simplify the tire replacement operation and/or the maintenance of the leveling wheel, as they are both time-consuming tasks.

Firstly, it is the object of the invention to prevent the leveling wheel and/or the planting disc from being blocked by sticks, canes or stubble left over from the previous harvest.

Secondly, another object of the invention is to simplify the tire replacement process, without having to remove the leveling wheel from the machine; thus reducing the time required for the task.

Thirdly, another object of the invention is to simplify the tasks of replacing the bearings without having to remove the leveling wheel from the machine; thus, reducing the time required for the task.

Finally, it is still another object of the invention to improve the lubrication tasks of the bearings used by the leveling wheel.

BACKGROUND OF THE INVENTION

The object of the present invention is a new leveling wheel, to be used in agricultural planting machines, which prevents the entry of crop debris left in the field from a previous harvest. Such debris is bound to get stuck between the planting disc and the leveling wheel itself and, consequently, affect their rotation. Besides, it reduces maintenance time of the leveling wheel whenever either greasing, replacement of the bearings or the tire is required, due to wear.

The wheel has curved side blades; it is located opposite to the planting disc and, as the blades project from the vertical plane of the rim, they hit the stubble when the machine moves in the forward driving direction. Thus, it succeeds in preventing the area between the planting disc and the leveling wheel from getting jammed with stubble. In fact, preventing jamming implies achieving the desired effect.

Another prominent feature is a quick-change ring, mounted on the external side of the leveling wheel, which firmly adjusts to the tyre. As only five bolts are required to fix the rim to the wheel structure, it is possible to remove and replace the tire without having to disassemble the entire wheel. The design of the quick-change ring favours easy adjustment, thanks to the particular geometry of its edges; the leveling wheel simply "lies" against the rim and it is fastened by means of the quick-change ring.

Additionally, it is not necessary to remove the complete wheel in order to change the bearings. Access may be gained to the bearings by merely removing the outer cap, after loosening a safety lock and manually unscrewing the cap.

In this way, the object of the present invention prevents the entry of agricultural debris into the area between the planting disc and the leveling wheel, significantly minimizing downtime. It compares most favourably to the leveling wheels currently used.

DETAILED DESCRIPTION OF THE INVENTION

Figure 1:
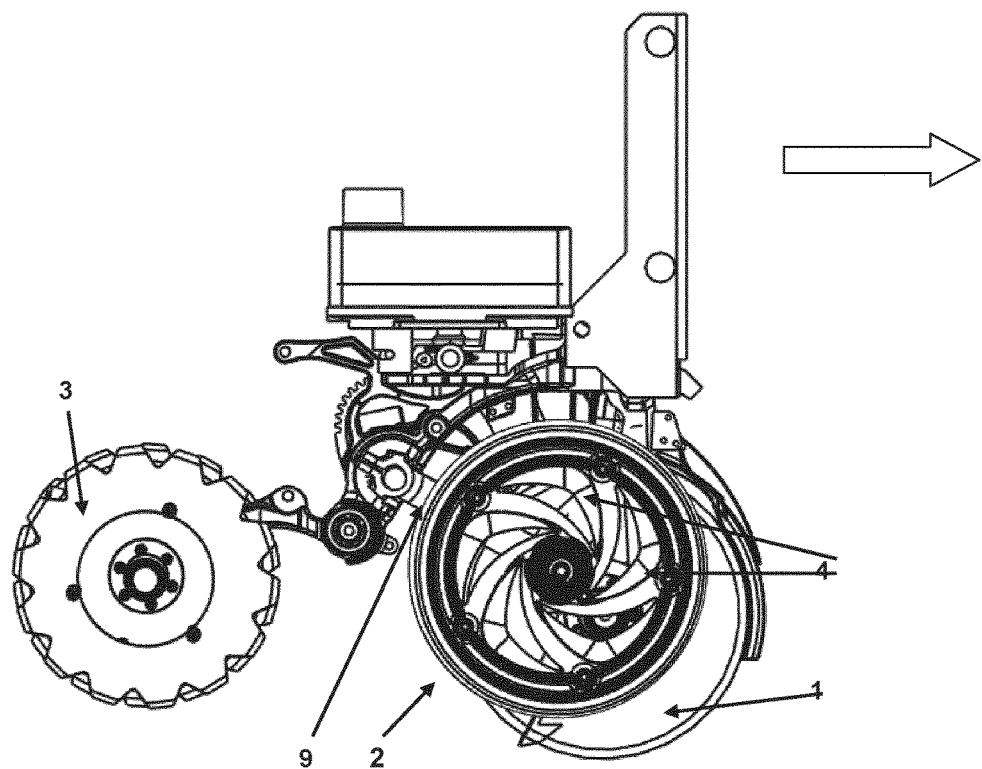
FIG. 1 is a side view of the object of the present invention mounted on a seeder.

FIG. 1 is a side view of a seeder with its planting disk (1), which opens the soil to form the furrows where the seeds are deposited. Also, the leveling wheel (2) that estimates the depth of the furrow opened by the planting disc (1), which is the object of the invention. Besides, there is the capping wheel (3) which ensures that the seeds, once deposited and fertilized, are covered by the soil to allow the plant to germinate adequately. In turn, the arrow indicates the direction of the forward motion of the planting unit, mounted on the tool-holder bar of a seed seeder, and pulled by a tractor. Unlike most equipment currently used, the leveling wheel (2) is not solid. Instead, it has a number of arc-shaped, curved blades (4), five in this figure, which link the center of the wheel with its periphery. The mounting arm (9) of the leveling wheel is also shown. It links it to the planting unit.

Figure 2:
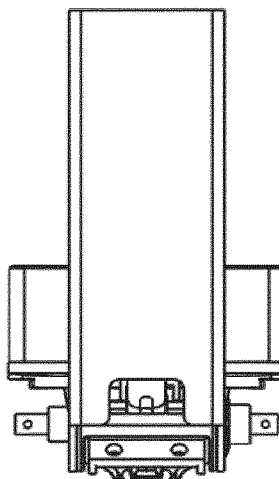
FIG. 2 is a front view of the seeder with the object of the present invention assembled.

FIG. 2 is a front view of the planting unit showing the planting disc (1); as shown, there are two discs close to each other and to both leveling wheels (2); one on either side of the planting disc and very close to it. The leveling wheels have a tire (5), made of either rubber or plastic. Also note how the curved blades (4), shown in the previous figure, project outwards from the vertical plane of the leveling wheels, which are a key feature of the object of the invention, as explained in the following drawings.

Figure 3:
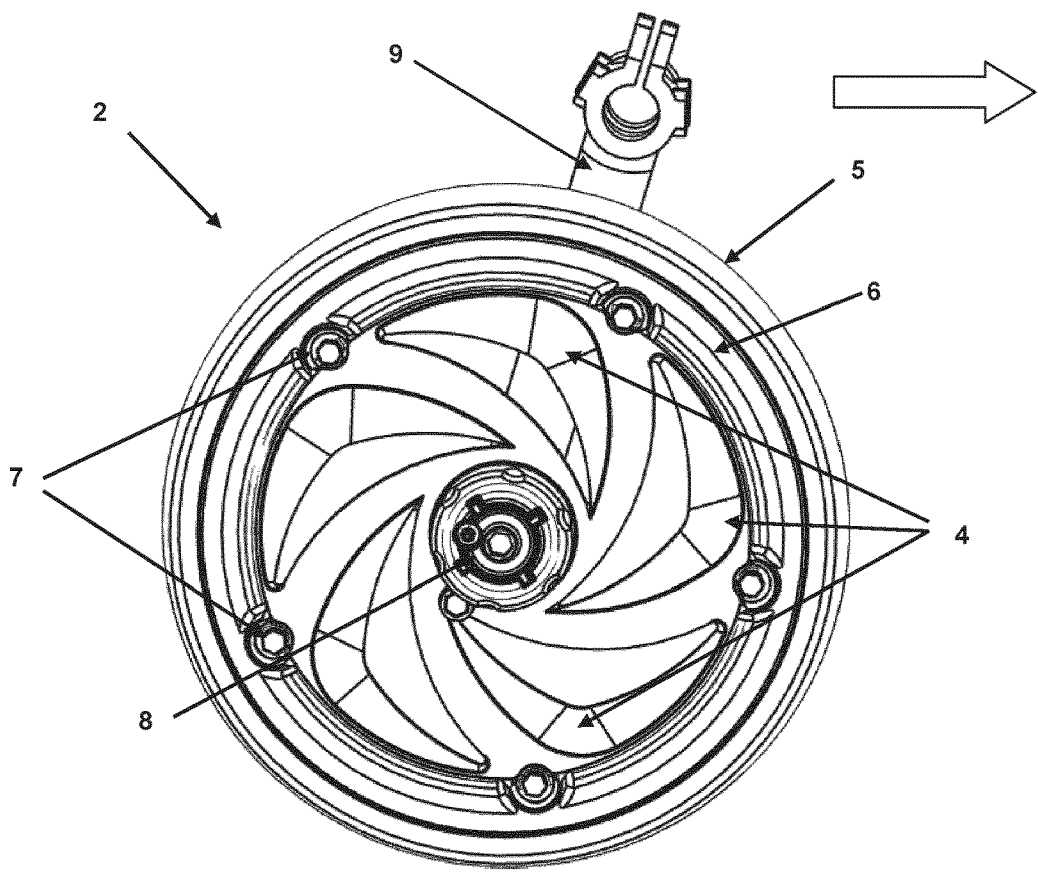
FIG. 3 is a side view of the object of the present invention.

FIG. 3 is a side view of the object of the invention, the levelling wheel (2), showing the tyre (5), the quick-change ring (6) linked by many screws or bolts (7) to the wheel rim; five in this figure, the arc-shaped curved blades (4) and a cap (8) over the bearings. They link the wheel with the mounting arm (9) of the levelling wheel to the planting unit frame. In addition, the arrow indicates the direction of the forward movement of the wheel while the machine is in operation. It is worth highlighting that the curved blades (4) are essential to prevent the entry of agricultural debris (reeds, logs, straw and other elements) towards the inner part of the wheel, next to the planting disc, as explained in the following drawings.

Figure 4:
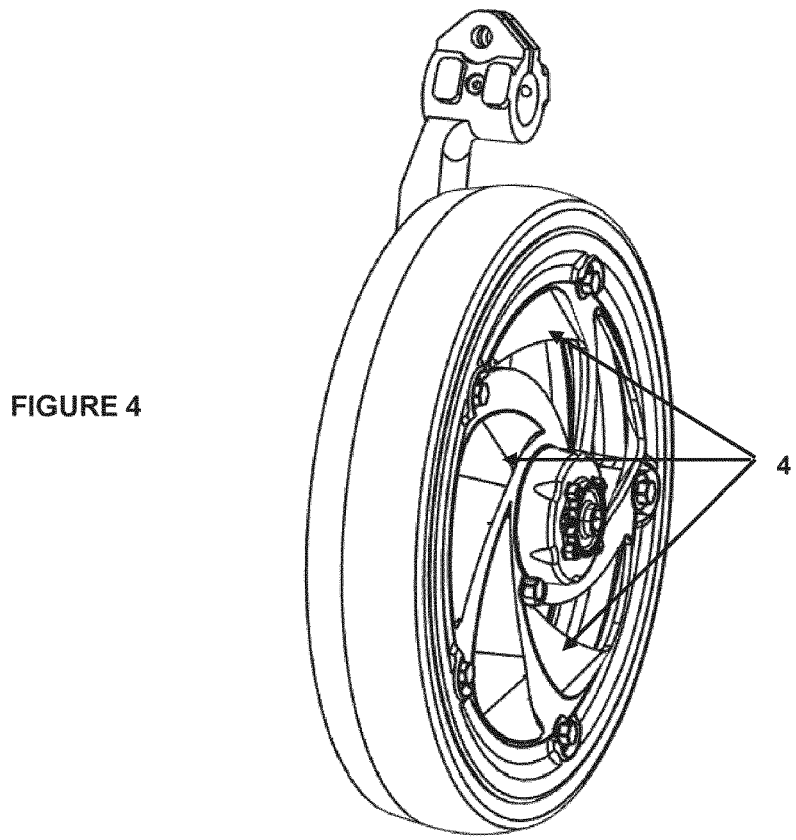
FIG. 4 is a perspective view of the object of the present invention.

FIG. 4 is a perspective view of the object of the invention, showing segments with a shape like curved blades (4) on the outer part of the wheel.

Figure 5:
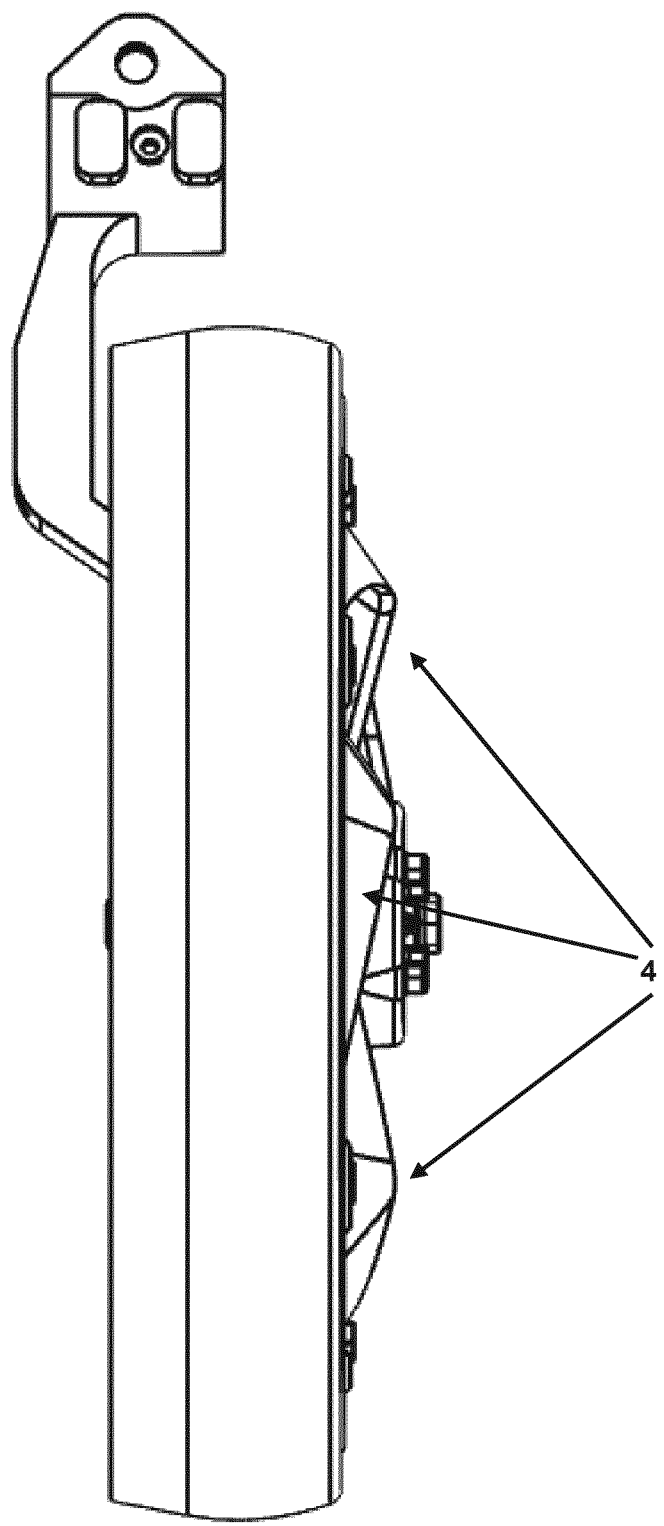
FIG. 5 is a front view of the object of the present invention.

FIG. 5 is a front view of the object of the invention depicting the curved blades (4) that project from the vertical plane of the wheel. They are designed to clear the stubble and other agricultural debris, thus preventing jamming of the open spaces between the blades, which may block the rotation of the leveling wheel and even of the planting disc itself.

Figure 6:
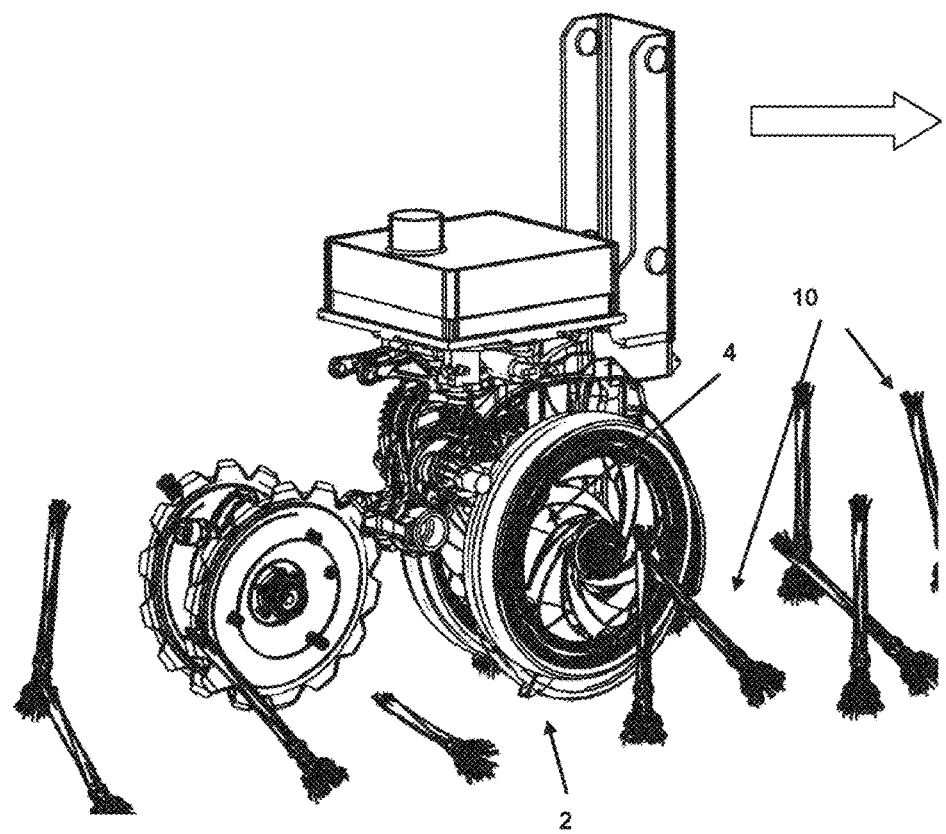
FIG. 6 shows the object of the present invention with stubble in the field.

FIG. 6 is a diagram showing the object of the invention operating in a field with corn stubble, where the stalks (10) failed to jam the leveling wheel (2) and the planting disc thanks to the curved blades (4) that hit them and prevent their entry during the forward movement of the seeder in the direction of the arrow. This situation is better shown in the following drawing.

Figure 7:
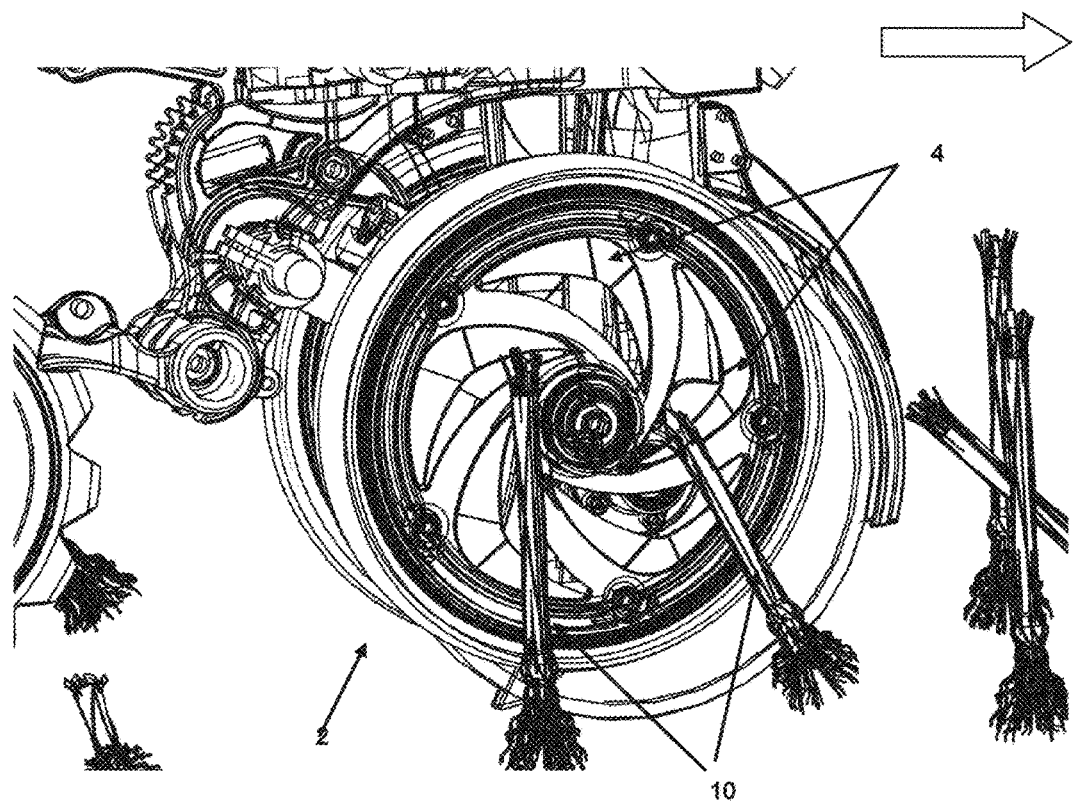
FIG. 7 is similar to FIG. 6, but in detail.

FIG. 7 allows a close-up view of the moment when one of the curved blades (4) hits a corn stalk (10), shaking it off from the outer side of the leveling wheel (2), preventing it from jamming the leveling wheel itself (2) or the planting disc. In other words, thanks to the curved shape of the blades (4) projecting from the external vertical plane of the wheel, while the machine moves forward in the direction of the arrow, different sections of the tilted blades shake off the stubble from the planting unit. This design is a major breakthrough compared to current leveling wheel design with spokes, which fail to avoid entry of said debris.

Figure 8:
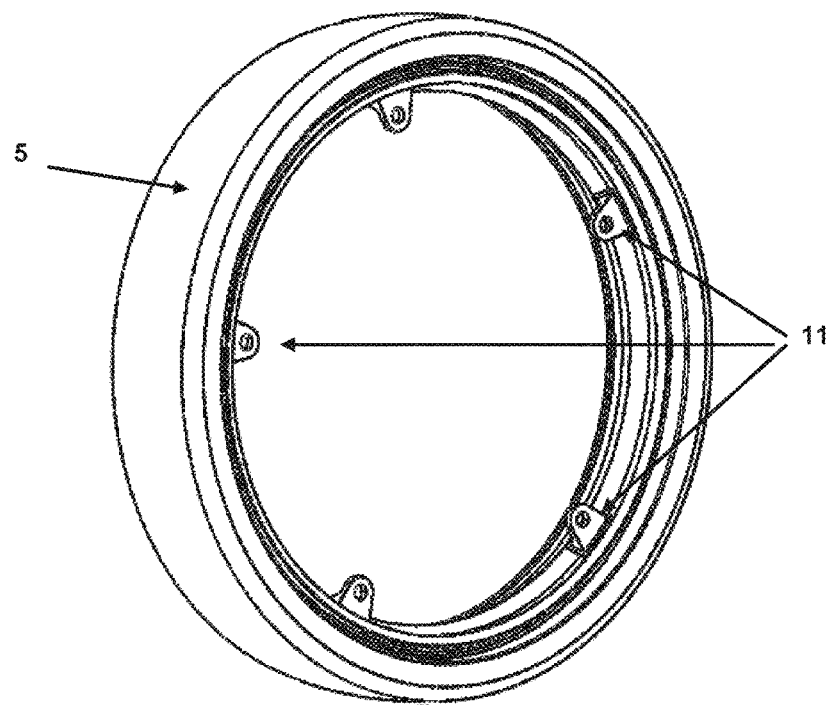
FIG. 8 is a perspective view of the tire of the object of the present invention.

FIG. 8 is a perspective view of the tire (5), the object of the invention, in which five eyelets (11) evenly spaced apart, will be used to adjust the tire on the rim by means of the quick-change ring, as best shown in the following drawing.

Figure 9:
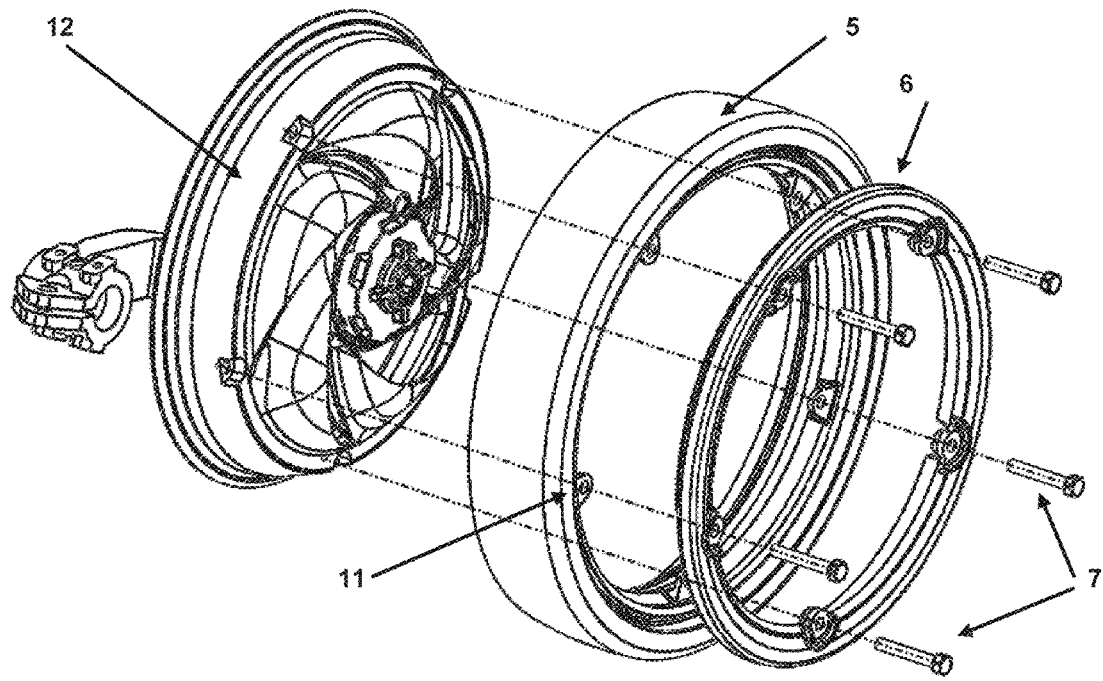
FIG. 9 is an exploded view of the assembly of the object of the present invention showing the components involved in tire replacement.

FIG. 9 is an exploded perspective view of the mounting of the tire (5) against the body of the rim (12), object of the invention. The openings in the quick-change ring (6) match the tire (5) eyelets (11) with screws or bolts (7) that secure the quick-change ring (6) and tire (5) assembly against the body of the rim (12); thus, ensuring sufficient tire anchoring and preventing the tire from coming off the rim when the machine is in operation. Then, it is evident that tire replacement only requires a very simple, effortless task and no specific tools; it only requires removal of the bolts (7) and detachment of the tire from the rim, thanks to its design that allows the tire to rest on the rim, as best shown in the following drawings.

Figure 10:
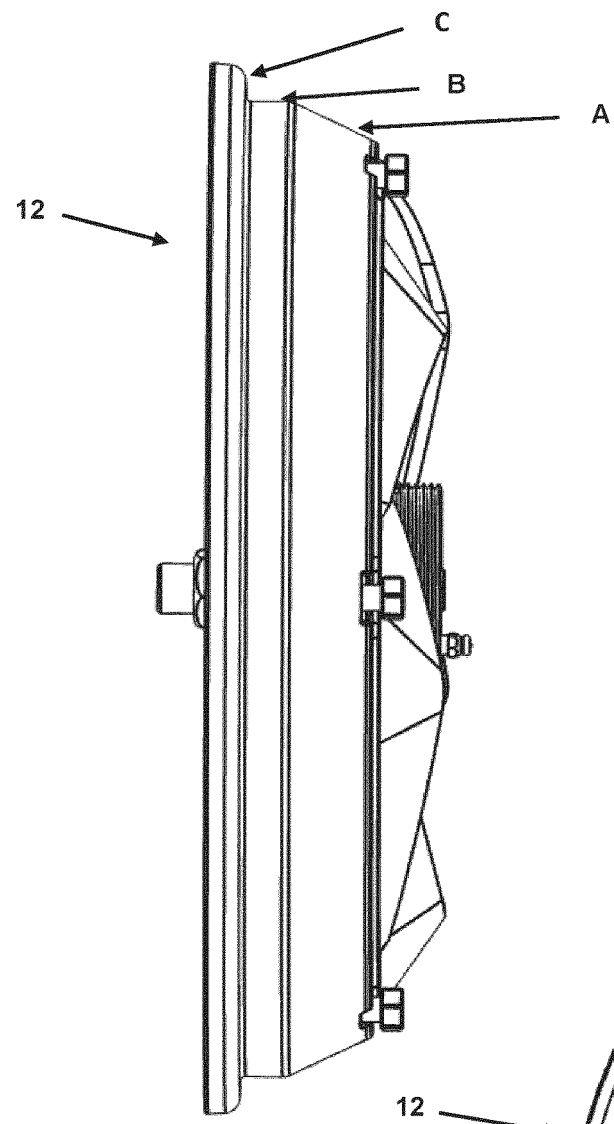
FIG. 10 is a front view of the rim of the object of the present invention.

FIG. 10 is a front view of the rim (12), object of the invention, that shows a cone-shaped profile (A) on the right side of the drawing, where the tire is mounted. It is followed by a horizontal segment (B) which ends in a vertical segment, rounded at the top (C), and perpendicular to the previous one. Therefore, by matching the design of the tire and the rim (12), it is possible to assemble and disassemble it in a very quick, simple manner without having to stretch the tire to mount it on the rim or having to use special tools.

Figure 11:
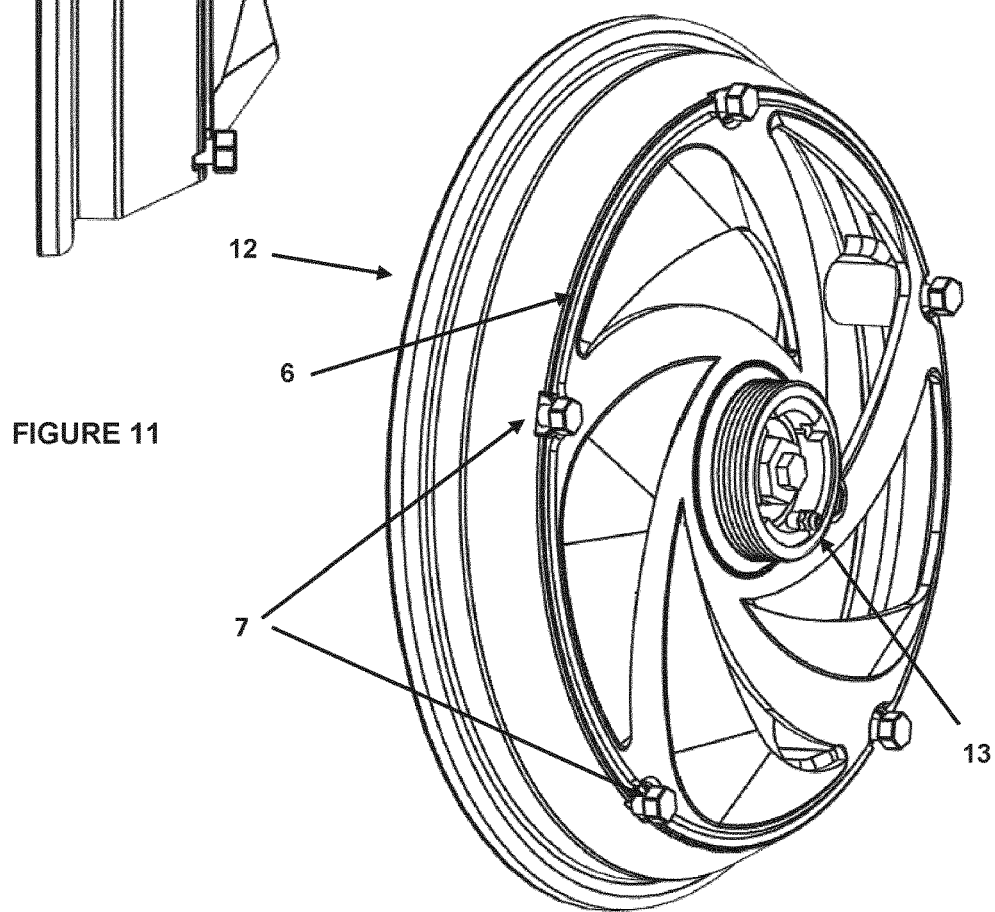
FIG. 11 is a perspective view of the rim of the object of the present invention.

FIG. 11 is a perspective view of the rim (12) from a different angle; it shows the singularity of the shape of the rim that facilitates tire mounting. Also shown, there are five screws or bolts (7) used to secure the quick-change ring (6) and the tire (5) against the rim structure (12). In addition, in the center of the wheel, the straight alemite (13) for the lubrication of the bearing system. The rim (12) may be manufactured with any high tensile strength materials, such as aluminum, steel, gray or nodular cast iron, or plastic, in any alloys or combinations.

Figure 12:
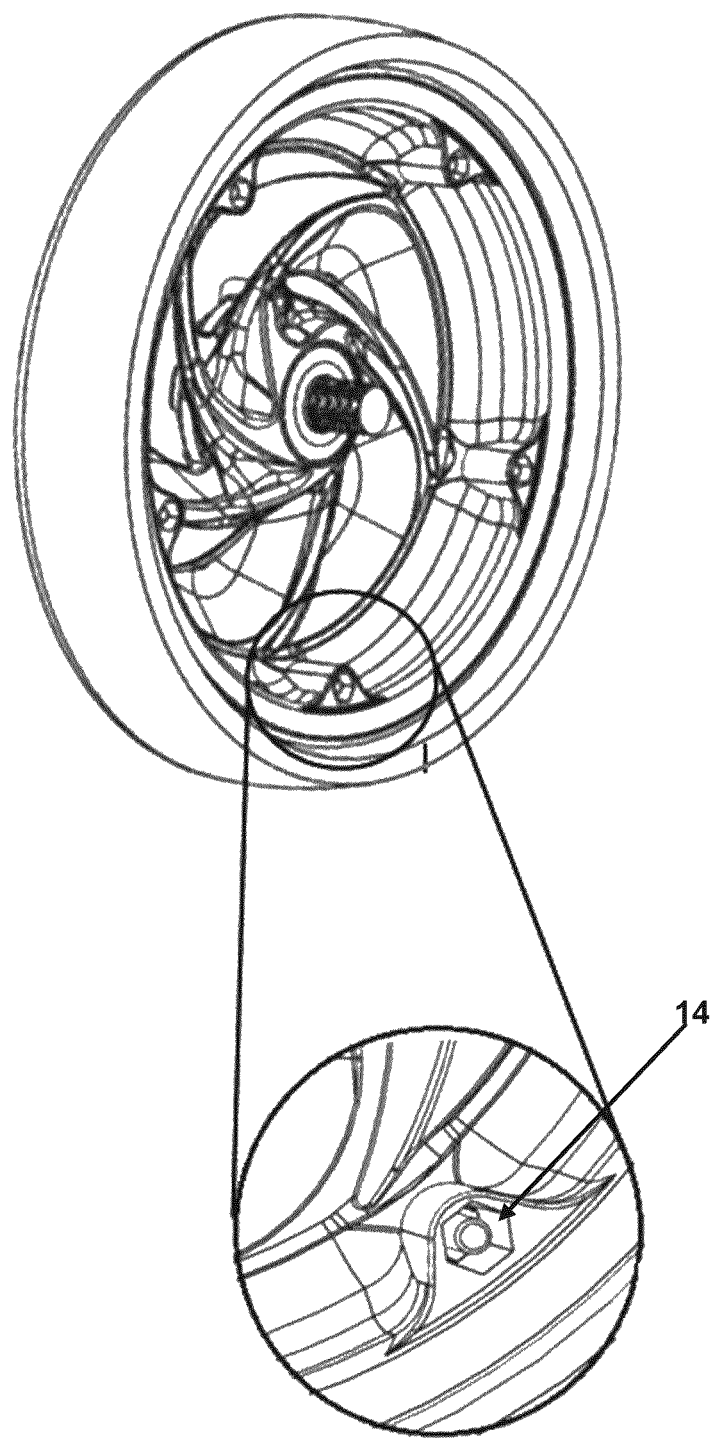
FIG. 12 is a view of the object of the present invention, from the inner side of the wheel.

FIG. 12 is a view of the object of the invention from the inner side of the wheel; it shows a detailed view of the nut-lock housing (14) for the nuts and bolts (7) used to tighten the quick-change ring (6), (not shown in this drawing). In this way, the quick-change ring (6) can be removed with a pipe wrench or a simple combined open-end wrench, to proceed to tire replacement (5), as shown more clearly in the following drawings. Additionally, having the nut-lock housings (14) saves time and simplifies maintenance tasks by avoiding the removal of the wheel to adjust the bolts (7) that tighten the quick-change ring (6) against the rim (12).

Figure 13:
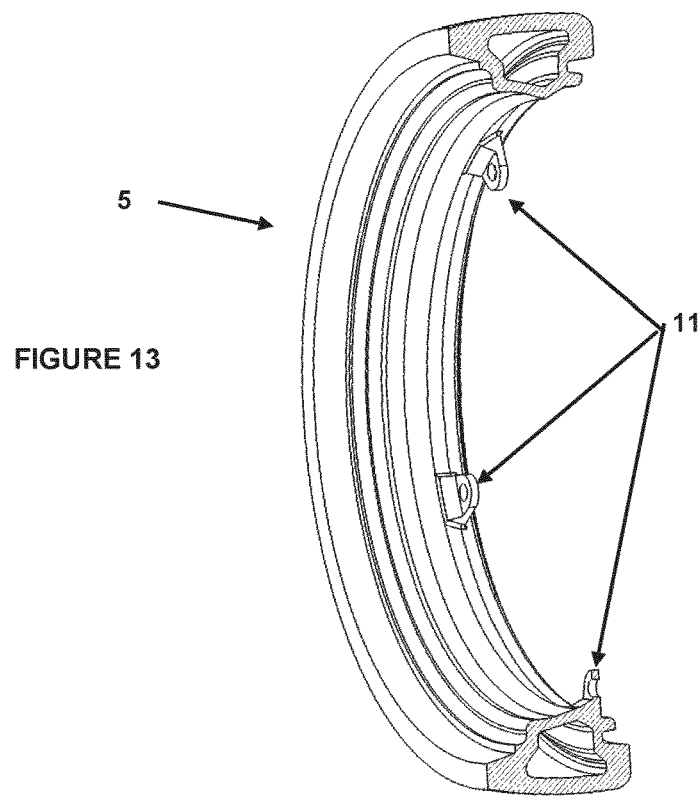
FIG. 13 is a perspective and sectional view of the tire of the object of the present invention.

FIG. 13 is a perspective and sectional view of the tire (5), that shows the asymmetrical design of the tyre, as shown on the left of the drawing, as it rests against the rim (12), embedding into the shape of the rim to facilitate mounting, as shown in drawings 10 and 11. It allows visualization of the eyelets (11) through which the bolts (7) secure the tire (5) against the rim (12).

Figure 14:
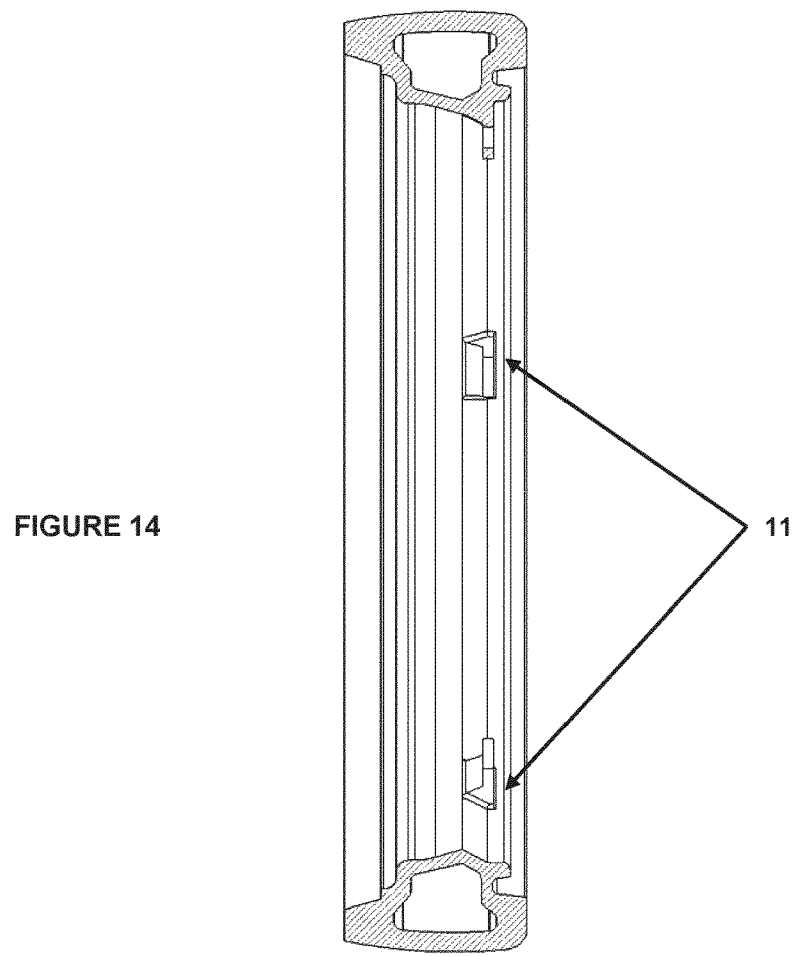
FIG. 14 is a sectional view of the tire that forms part of the object of the present invention.

FIG. 14 is another front sectional, partial view of the tire (5) and the eyelets (11) used to secure the tire (5) against the rim (12). It also shows that its left lateral edge differs from its right edge, since while the left side is mounted on the rim (12), the right side is fitted by means of the quick-change ring (6) (not shown in this drawing; it can be viewed in the next drawing).

Figure 15:
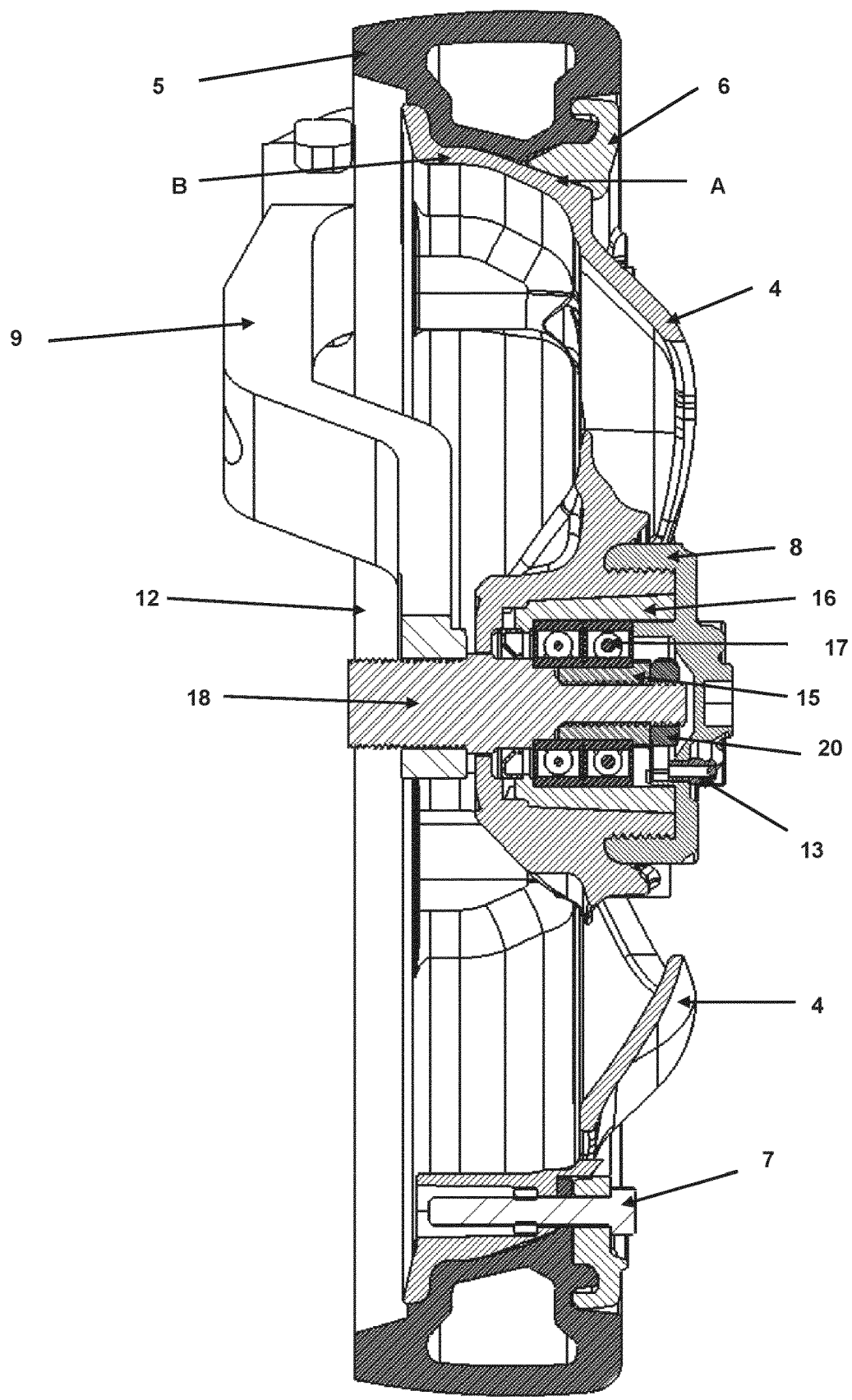
FIG. 15 is a vertical sectional view of the object of the present invention with all its components

FIG. 15 is a vertical section view of the object of the invention that allows viewing the tire (5), mounted on the rim (12), secured by the quick-change ring (6), which is adjusted by one of the screws or bolts (7) against the rim structure (12). Both the tire (5) and rim diameters (12) are identical all along sector (A), except in the final section, sector (B), where there is a small difference between said diameters. It is evident that the replacement of the tire becomes a very simple and fast operation since it is enough to remove the screws or bolts (7) that adjust the quick-change ring (6) on the tire (5) and push it out of the rim (12), since it is almost leaning against it. Also shown, are the curved blades (4) that prevent agricultural debris from entering the wheel. Besides, the mounting arm (9) that links the leveling wheel with the structure of the seed seeder and the screw cap (8) that covers the bushing (16) and the bearings (17) that link the wheel with the shaft (18) of the mounting arm (9) of the leveling wheel. Also shown in this drawing are: the inner adjustment bushing (15) of the bearings, the bearing adjustment nut (20) and the straight alemite (13). It is also worth highlighting in the drawing the particular curved shape of the blades (4) that allow to "push" out the stubble that might get into said blades. In FIG. 26 you can also see a rendered image of the object of the invention illustrating the functional design of the blades (4).

Figure 16:
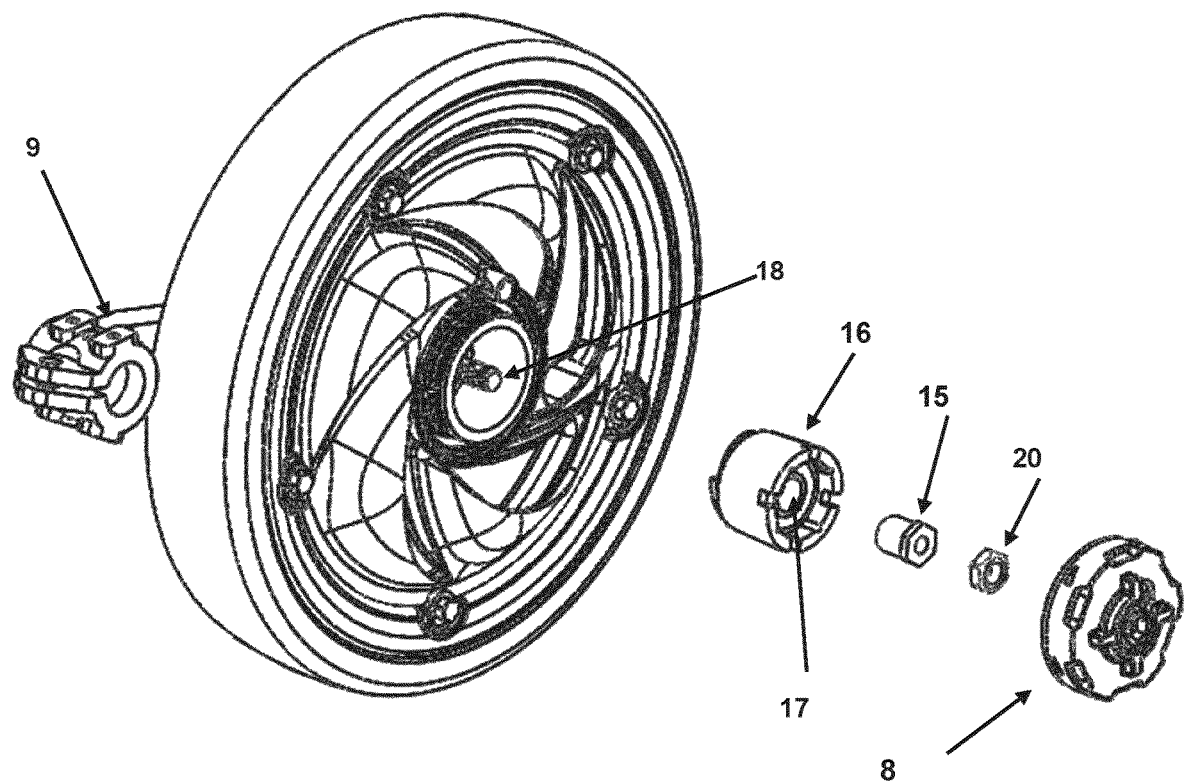
FIG. 16 is an exploded view of the object of the present invention that shows all the components related to the replacement of bearings.

FIG. 16 is an exploded view of the components that allow the exchange of the bearings. First, the axis (18) of the mounting arm (9) of the leveling wheel can be seen and the bushing (16) that houses the bearings (17) inside. The bushing can vary from a single bushing with a double track or two single-track bushings. Also shown are: the inner adjustment bushing (15) of the bearings (17), to the nut (20) for the internal adjustment of the bearings (17), and finally the screw cap (8) that covers the bushing (16).

Figure 17:
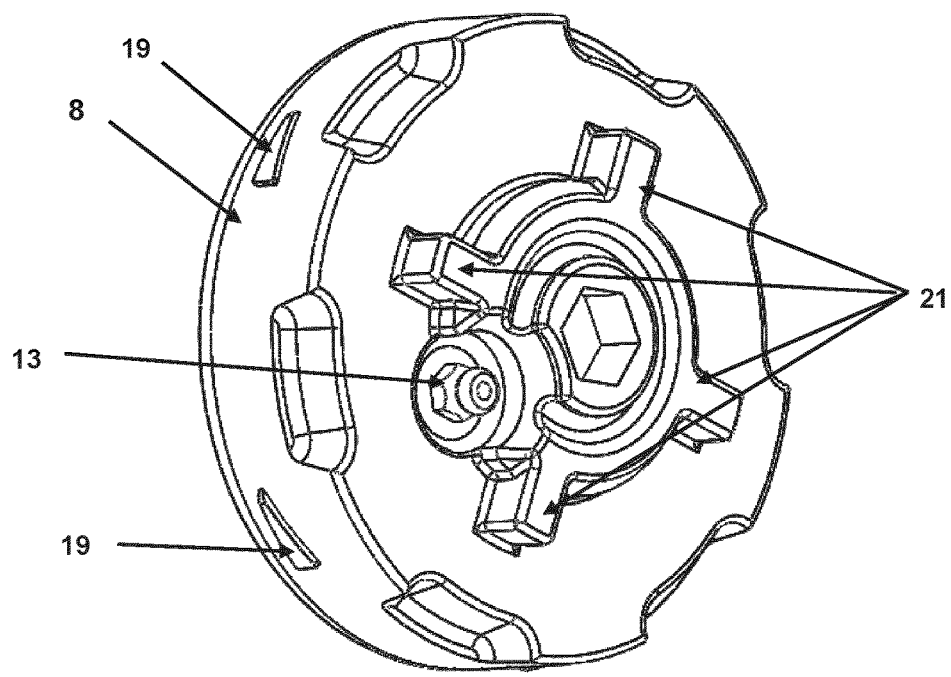
FIG. 17 is a perspective view of the cap that houses the bushing with the bearings.

FIG. 17 is a perspective view of the cap (8) with the straight alemite (13) which allows greasing the bearings from outside, without even removing the cap (8). It also shows five lateral ribs (19) in the periphery of the cap, and four upper ribs (21) whose function will be further explained in drawings 24 and 25 respectively.

Figure 18:
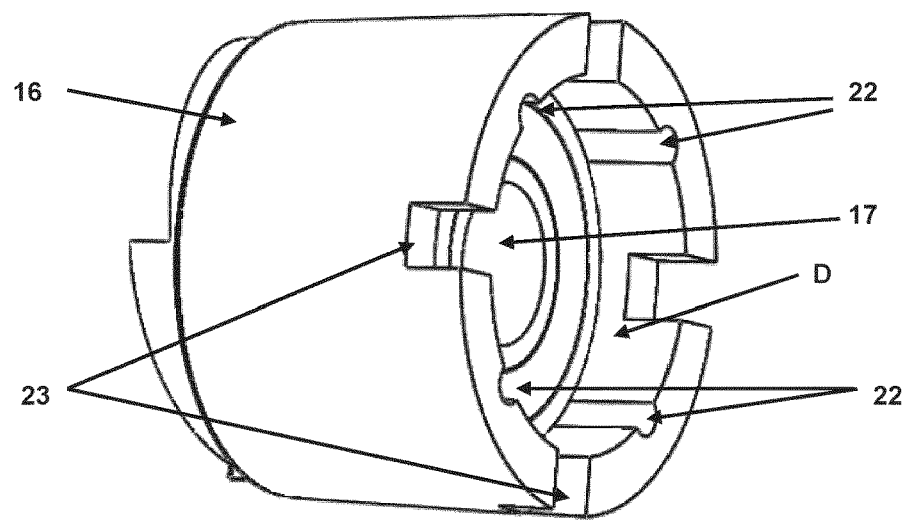
FIG. 18 is a view of the bushing that houses the bearings.

FIG. 18 provides a more detailed view of the bushing (16) that contains the bearings (17). The bushing has four grooves (23) towards the outer side of the wheel, as shown in drawing (16) and multiple channels (22), to lubricate both bearings (17); four channels are used in this design. These channels (22) were designed to allow ready access and complete lubrication of even the opposite side of the bearings and the greasing chamber comprising the cap (8) and the bearings (17). In order to gain access to the lubrication channels (22), it is enough to insert the grease gun into the straight alemite (13), (not shown in this drawing) that allows the chamber space (D) to be filled with grease. This chamber space comprises the volume formed by the bearing (17), the lateral edges of the bushing (16) and the screw cap itself (8) (not displayed in this drawing). All this ensures that the lubrication process is very fast and effective.

Figure 19:
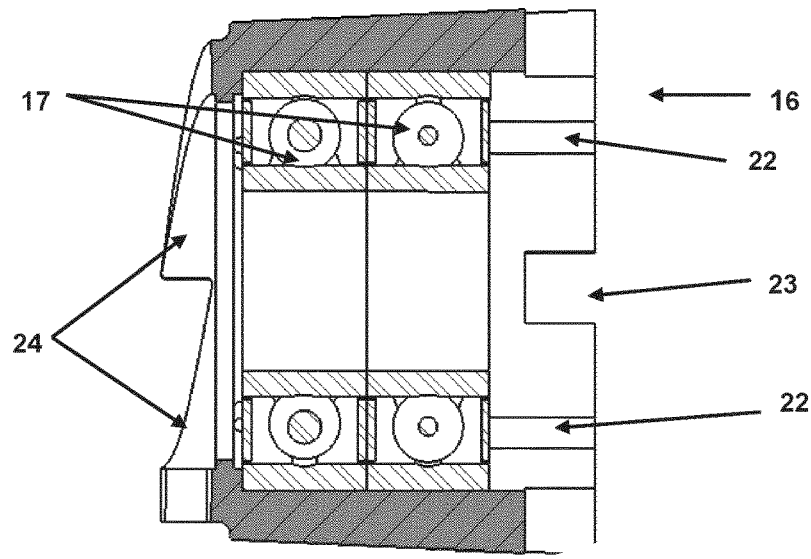
FIG. 19 is a sectional view of the bushing and bearings.

FIG. 19 is a side section view of the bushing (16) that contains the bearings (17). It shows two of the lubrication channels (22) and, mainly, the bushing with a taper on its outer part; thus, the left side of the drawing is slightly smaller in diameter than its right counterpart, which stands in the direction of the cap (8) (not shown in the drawing). This facilitates easy removal or replacement of the bearings (17) together with the bushing (16) without causing any impact on any parts; it is only enough to turn it 90° in counter-clockwise direction to be able to remove the entire set. This will be clearer with the action of the ejection ramps (24) and the three drawings that follow.

Figure 20:
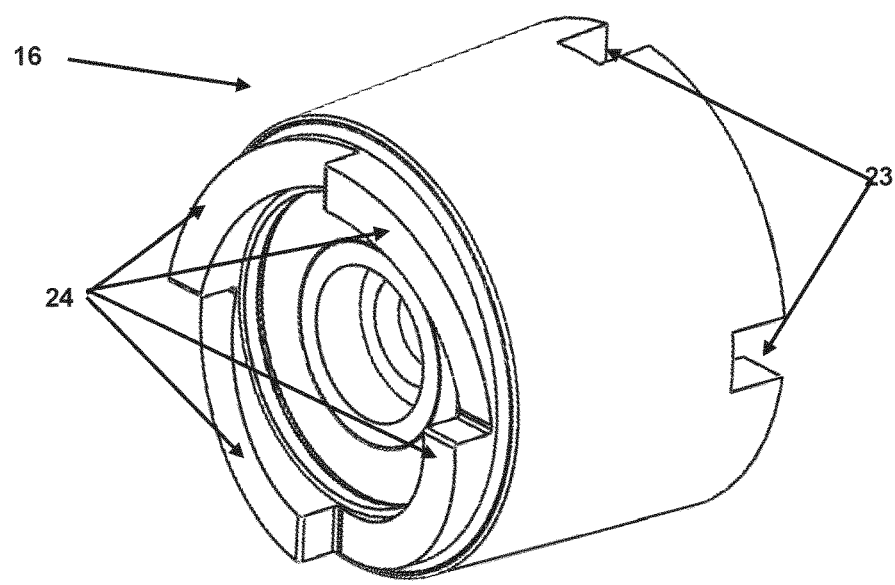
FIG. 20 is another view of the bushing with the bearings inside.

FIG. 20 is a perspective view of the bushing (16), which shows two of the grooves (23) and the four ejection ramps (24) of said bushing. The ramps and the rim (12) share the same wedge-shaped design, as shown in the two drawings that follow.

Figure 21:
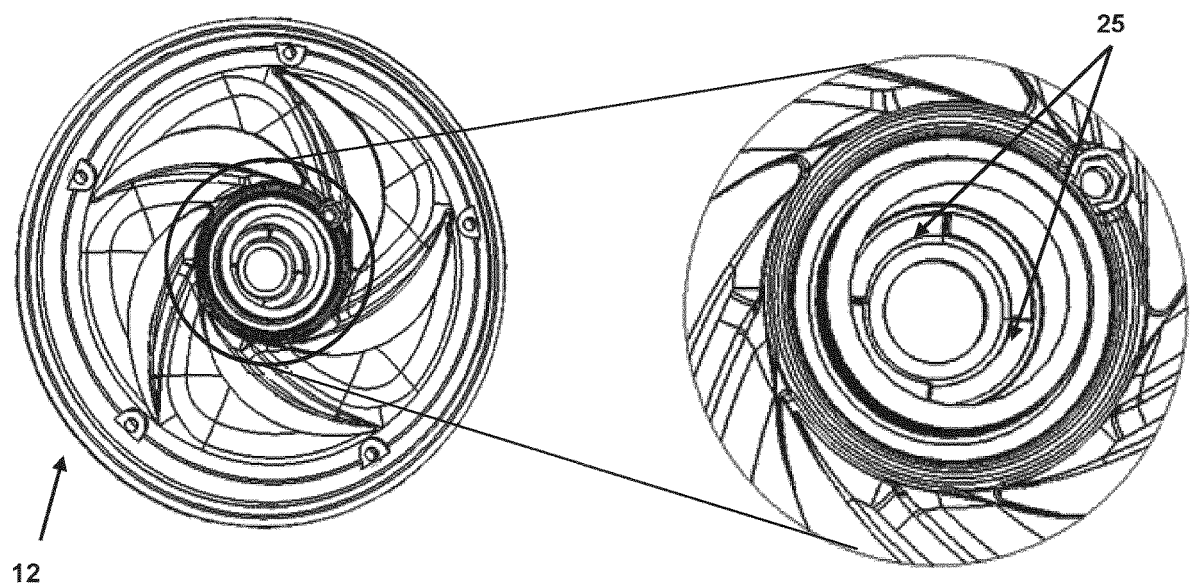
FIG. 21 is a detailed side view of the ejection ramps on the rim for replacement of the bearings.

FIG. 21 is a side view of the rim (12), object of the invention, depicting in detail an exploded image (right) the base of the bushing housing (16). It has a similar ramp design or wedges (25) to the ramps or wedges (24) in the bushing (16). This is best shown in the following drawing.

Figure 22:
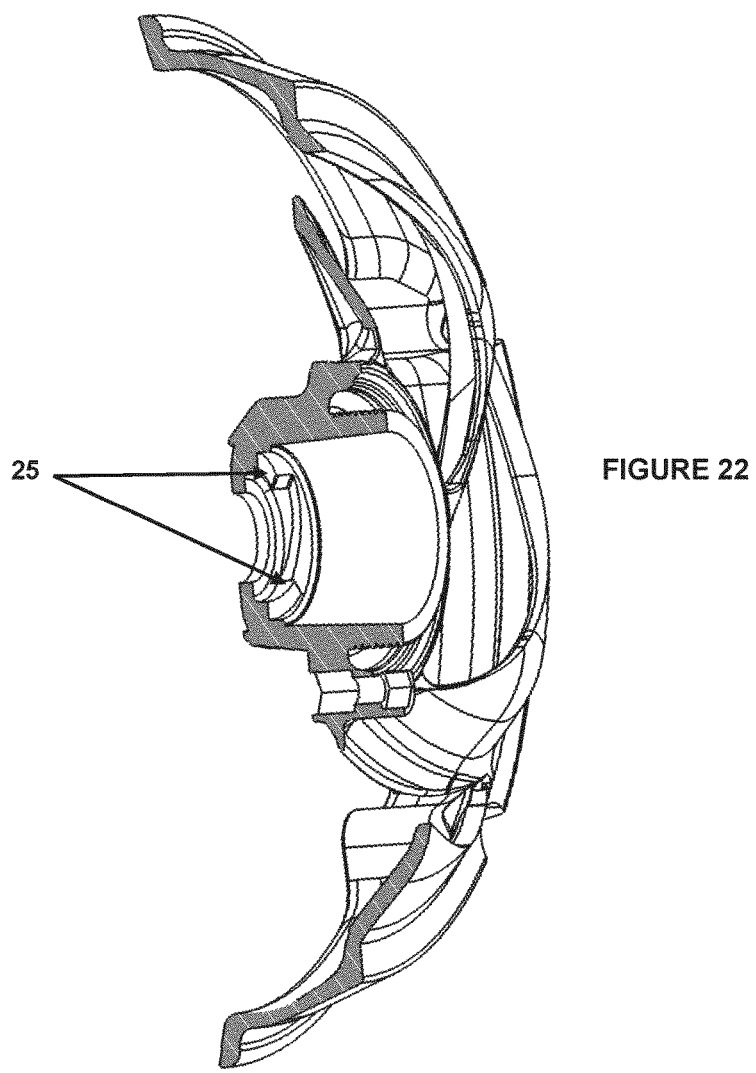
FIG. 22 is a vertical section view of the rim where the ejection ramps of the outer bushing are shown in detail.

FIG. 22 is a vertical section view of the rim (12), object of the invention, showing the space that houses the bushing (16) with its ramps or wedges (25) at its base. They match in shape and size the ramps or wedges (24) of the bushing (16). Thus, whenever the bushing (16) is rotated 90° counterclockwise, both sets of ramps (24) and (25), the bushing and the rim ramps or wedges respectively, work alongside each other, expelling in an axial direction the bushing-bearing assembly out of the wheel. Depending on the height of the ramps (24) and (25), a minor displacement may be achieved; however, just a few millimeters may be enough to allow removal of and replacement with a new set of bushing and bearings.

Thanks to the fact the bearings (17) are nailed to the bushing (16), that their external conical shape and the wedges or ramps (24) on one of their sides rest on identical wedges or ramps (25) of the rim (12) allows quick, easy and effective removal of the bushing-bearings set. Undoubtedly, an efficient design of the object of the invention minimizes time and effort in removing the wheel from the machine without damaging any part or requiring the use of any special tools. Further explanations will be provided in the following drawings.

However, as shown in FIGS. 19 to 22 although the use of wedges or ramps (24) and (25) for extraction of the wheel is the preferred embodiment, it is possible to adopt other ways for easy removal of the bushing (16) from the rim (12). For instance, instead of using the wedge or ramp system (24), at the base of the bushing, a threaded surface inside the bushing bushing (16) and the rim (12) could be used. Thus, it could simply require unscrewing them once the cap (8) is removed.

Figure 23:
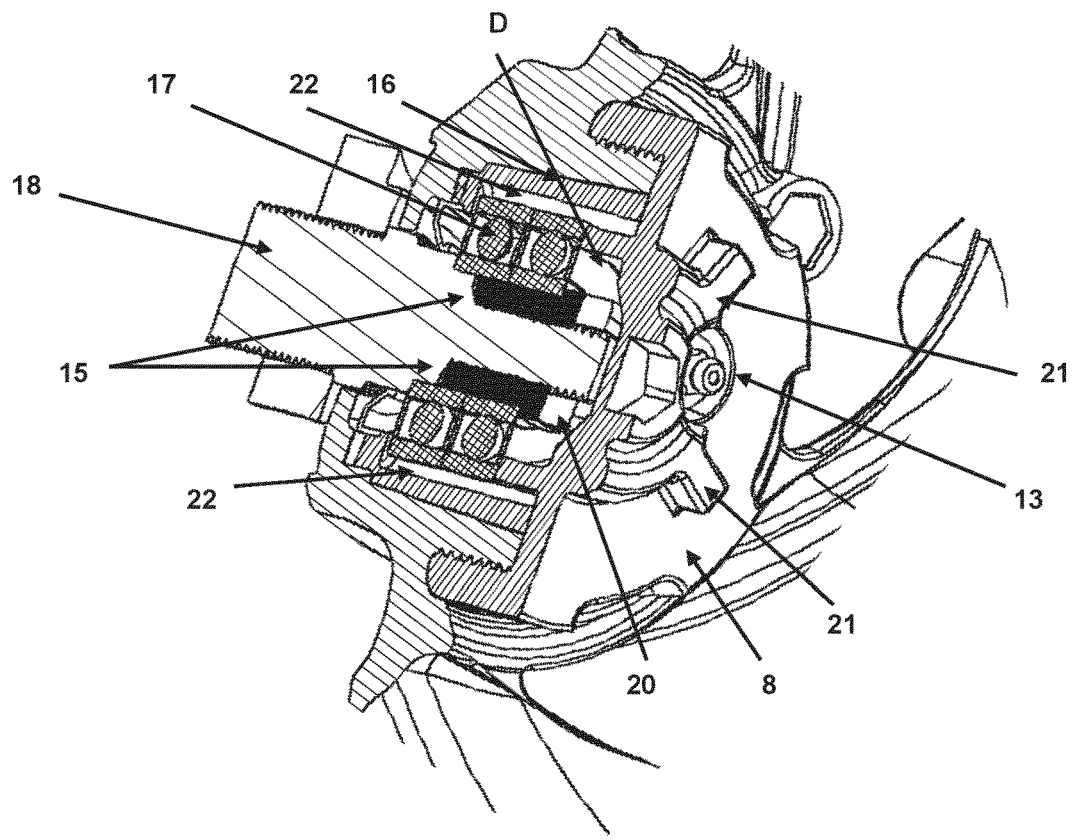
FIG. 23 is a sectional view of the lubrication system for the replacement of bearings, with cap included.

FIG. 23 is a perspective and sectional view of the system used by the object of the invention to link the leveling wheel with the mounting arm (9) and its shaft (18) (not shown in the drawing). Also shown are: the bearings (17), the bushing (16), two of the lubrication channels (22), the inner bushing lock (15), the inner fastening nut (20) of the bearings (17), the cap (8) with its upper ribs (21), the straight alemite (13), and finally the chamber (D) that is filled with lubricant for the bearings. The above description provides a better understanding of the best embodiment of the system used to link the leveling wheel to the mounting arm (9).

Figure 24:
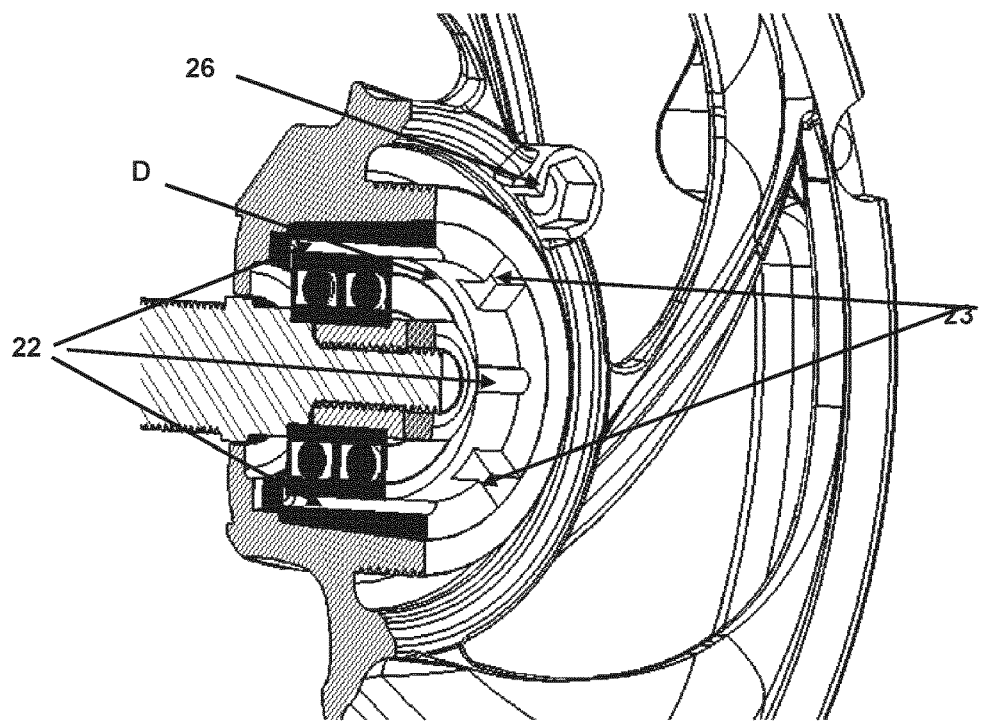
FIG. 24 sectional view of the lubrication system for the change of bearings, without the cap.

FIG. 24 is similar to the previous one but without the cap (8). This clearly shows the housing (26), which allows inserting a bolt to secure the cap once it is in place and thus, preventing it from unscrewing itself while the machine is in operation in the field. The functional role of the lateral ribs (19) shown in FIG. 17 can now be fully understood. Once the cap and the bolt are in place, one of the locks (19) will rest against it, preventing the cap (8) from unscrewing itself while the machine is in operation. Although it seems a very simple safeguard system, it succeeds in preventing incoming soil, grass, etc. from entering into the bearing system. In turn, the drawing also allows clear viewing of the lubrication chamber (D) mentioned in FIG. 18; also, three out of the four lubrication channels (22) and two of the four grooves (23), whose functional validity will be described in the following drawing.

Figure 25:
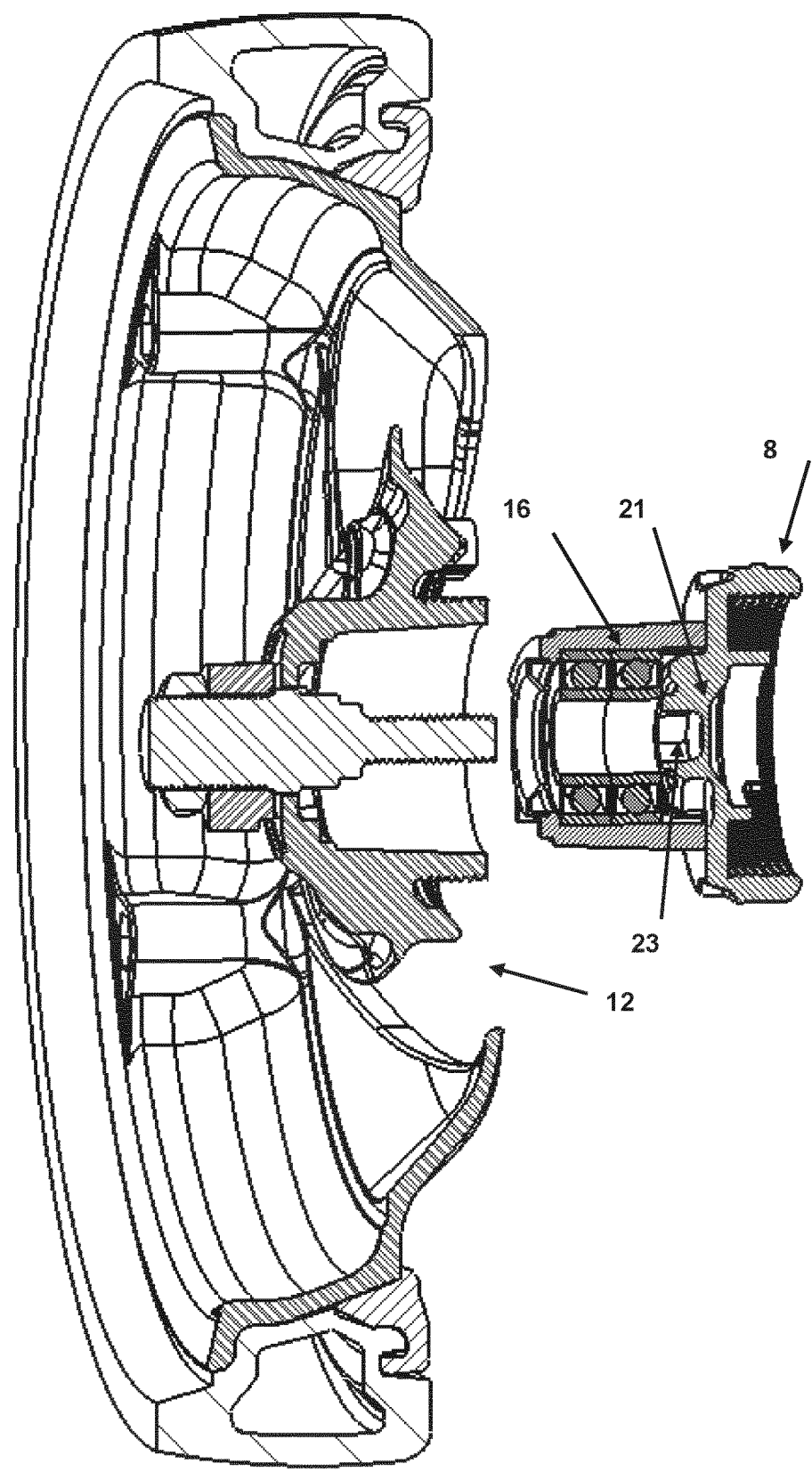
FIG. 25 shows the bearing cap used as a wrench to remove the outer bushing and bearings.

FIG. 25 allows us to understand the function of the upper ribs (21) of the cap (8) shown in FIG. 17. They match the grooves (23) of the bushing (16) both in size and distribution. After unscrewing the cap (8) from the rim (12), and removing the nut (20) acting as the inner fastening of the bushing (15), the cap (8), once opened, may serve as a cross wrench and the ribs (21) on its outer part fit into the grooves (23) of the bushing (16). Even if the system of wedges or ramps (24) and (25) were replaced by the above-mentioned threaded system, the use of the cap (8) as a cross wrench to remove the bushing (16) also applies. In short, this drawing is a vertical section view of the object of the invention that allows the cap (8) to be seen with its ribs (21) embedding into those (23) of the bushings (16), exactly in the same position in which the bushing-bearings assembly can be removed from the rim (12). In addition, it is worth highlighting that the rim (12), the conicity of the concavity that houses the bushing (16) can be easily seen upon removal of the bushing.

Figure 26A:
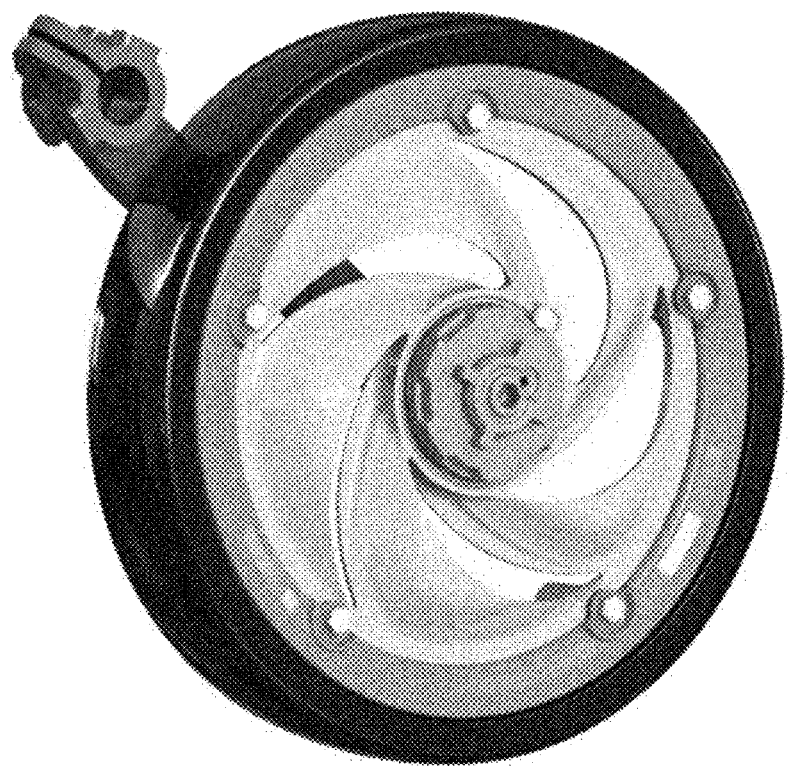
FIG. 26a and FIG. 26b are rendered images of the object of the present invention for a better appraisal.
Figure 26B:
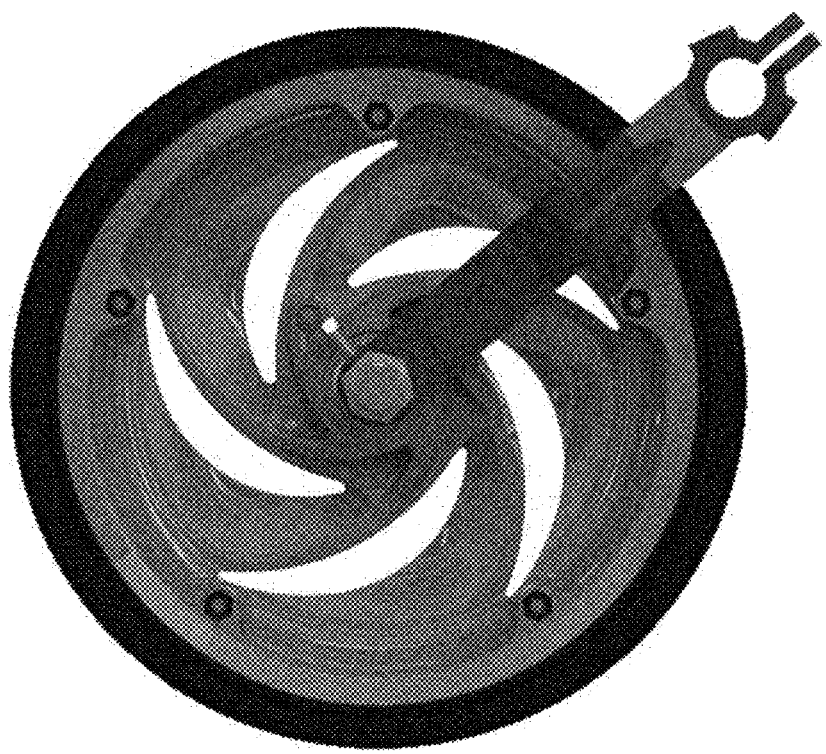

Finally, FIGS. 26a and 26b are a rendered image of the object of the invention, added to gain a better view of its outer structure, on both sides of the wheel.

In short, the object of the invention, the leveling wheel of the planting unit of an agricultural seeder machine, is precisely what prevents the entry of stubble into it. Thus, avoiding the jamming of the planting disc or the leveling wheel itself. It also facilitates the replacement operation of the tire thanks to the design structure and its coupling with the wheel rim and its adjustment by means of a quick-change ring and some bolts. Finally, it facilitates lubrication and replacement of the bearings, without having to remove the wheel from the machine and avoiding the potential risk of damaging its components. All these innovative features do assure a more efficient operation of the planting process and a very significant reduction in maintenance downtime of the planting unit as it compares most favourably to other systems in the current state of the art.

The invention claimed is:

1. A detachable depth gauge leveling wheel with stubble sweeper applicable in planting units mounted to a structure of an agricultural seeder machine and used to define a depth of the furrow opened by a planting disc to achieve uniform planting, with one or two wheels per unit, the detachable depth gauge leveling wheel with stubble sweeper comprising:
   a rim with multiple curved blades projecting from one of its sides towards the outer vertical plane of the wheel and extending between the center of the wheel and a periphery of the wheel and spaced equidistant from each other, leaving multiple curved, open and equal spaces and linked through multiple screws or bolts to a quick-change ring, the quick-change ring linking the rim with a tire and eyelets of the tire and different lateral profiles, since on one side the tire is resting on the rim and, on the other, the tire is related to a quick-change ring, the quick-change ring having a bushing that relates the wheel to a shaft of a mounting arm, with a plurality of lubrication channels on an inner side of the bushing while on its an outer side it has a slightly conical shape, which can be rotated 90° counterclockwise, comprising wedges or ramps on an end of the bushing that interact with similar wedges or ramps on the rim and, at the other end, the bushing has four grooves that can be related to four upper ribs engraved on a cap, which, in turn, has a plurality of lateral ribs and one of the ribs of the plurality of the ribs is linked to a bolt mounted in a housing.

2. The detachable depth gauge leveling wheel with stubble sweeper according to claim 1, wherein the rim is selected from the group of aluminum, steel, gray cast iron, nodular cast iron, plastic, an alloy thereof, or combinations thereof.

3. The detachable depth gauge leveling wheel with stubble sweeper according to claim 1, wherein screws or bolts are inserted in the eyelets of the tire and in nuts mounted in the corresponding nut-lock housing of the rim.

4. The detachable depth gauge leveling wheel with stubble sweeper according to claim 1, wherein the cap can be removed after unscrewing the bolt mounted in the housing.

5. The detachable depth gauge leveling wheel with stubble sweeper according to claim 1, wherein the bushing can be rotated 90° counterclockwise by inserting the upper ribs of the cap into the grooves of the bushing.

6. he detachable depth gauge leveling wheel with stubble sweeper according to claim 1, wherein the wedges or ramps axially extracts the bushing from inside the rim.

7. The detachable depth gauge leveling wheel with stubble sweeper according to claim 1, wherein the bushing and the housing in the rim are threaded and are linked.

* * * * *